United States Patent [19]
Ferguson et al.

[11] Patent Number: 5,274,805
[45] Date of Patent: Dec. 28, 1993

[54] METHOD OF SORTING AND COMPRESSING DATA

[75] Inventors: David E. Ferguson, Fawnskin; Eduardo C. Ross, Big Bear City, both of Calif.

[73] Assignee: Amalgamated Software of North America, Inc., Big Bear Lake, Calif.

[21] Appl. No.: 894,114

[22] Filed: Jun. 5, 1992

Related U.S. Application Data

[63] Continuation-in-part of Ser. No. 467,796, Jan. 19, 1990, Pat. No. 5,121,493.

[51] Int. Cl.$^5$ .............................................. G06F 7/22
[52] U.S. Cl. ........................... 395/600; 364/DIG. 2; 364/966.3; 364/951.3; 364/939.4
[58] Field of Search .................. 364/DIG. 1 MS File, 364/Dig. 2 MS File; 395/600

[56] References Cited

U.S. PATENT DOCUMENTS

| | | | |
|---|---|---|---|
| 3,593,309 | 7/1971 | Clark, IV et al. | 364/DIG. 2 |
| 3,602,895 | 8/1971 | Loizides | 364/DIG. 2 |
| 4,209,845 | 6/1980 | Berger et al. | |
| 4,417,321 | 11/1983 | Chang et al. | |
| 4,499,555 | 2/1985 | Huang. | |
| 4,559,612 | 12/1985 | Vrielink. | |
| 4,567,572 | 1/1986 | Morris et al. | |
| 4,595,995 | 6/1986 | Alles. | |
| 4,628,483 | 12/1986 | Nelson. | |

*Primary Examiner*—Thomas M. Heckler
*Attorney, Agent, or Firm*—Spensley Horn Jubas & Lubitz

[57] ABSTRACT

A method for sorting data in a computer data storage system that has particular advantages in implementing a key index tree structure. The sorting method uses buffer-size substrings to sort strings of key records into a linked list structure that can be directly transformed into an index tree. The sorting method also may be used for sorting large sets of data records in place on a computer storage system. The method further integrates prefix compression and suffix compression of key records with the sorting method to reduce the number of input/output operations required to create a more compact key index tree structure.

38 Claims, 9 Drawing Sheets

TREE STRUCTURE

METHOD OF SORTING AND COMPRESSING DATA

RELATED APPLICATION

The following application for patent is a continuation-in-part of Ser. No. 467,796, filed Jan. 19, 1990, now U.S. Pat. No. 5,121,493, issued Jun. 9, 1992, entitled DATA SORTING METHOD.

BACKGROUND OF THE INVENTION

1. Field of the Invention

This invention relates to a method for sorting data in a computer data storage system, and more particularly to a method for sorting and compressing data that has particular advantages in implementing a key index tree structure.

2. Description of the Prior Art

In the computer arts, data is typically stored in some form of non-volatile storage system, such as magnetic disks, in the form of data records. Typical operations conducted using such data records are reading of records; deletion of records; modifying and re-writing existing data records; and adding new data records.

For very large data bases, it is extremely inefficient and time consuming to sequentially search all data records in the storage system in order to find a particular record to read, delete, or modify, or to locate the appropriate place to add a record.

A more efficient, but still cumbersome and time consuming, search method requires creating a search key for each data record that uniquely identifies the record. Each search key is associated with a record pointer that indicates the location in the computer storage system of the data record associated with the search key. A common type of pointer is a relative record number. Through the use of such record pointers, the data records themselves need not be kept in sequential order, but may be stored in random locations in the computer storage system. A search for a particular data records is speeded up by sequentially searching a compiled index of such key records (comprising search keys and record pointers), rather than the data records themselves. However, such sequential searching is still relatively slow.

A much more efficient search method for such a key index is to create a "tree" structure, rather than a sequential file, for the key records. One such tree structure is a "B-tree", an example of which is shown in FIG. 1. The use of B-trees to structure indexes for data files in computer data storage systems is well known in the prior art. (See, for example, Knuth, *The Art of Computer Programming.* Vol. 3, pp. 473-479). A B-tree consists of nodes which can be either leaf nodes or branch nodes. A branch node contains at least one search key and related pointers (such as relative node numbers) to other nodes. A leaf node contains at least one search key and pointers to data records. One node in the tree is the root node, which can be either a leaf node (only for a tree with a single node) or a branch node. The "height" of a tree is equivalent to the number of nodes traversed from the root node to a leaf node. Searching for a data record is accomplished by comparing a key to the contents of the root node, branching to branch nodes based on such comparisons, comparing the key to the contents of such branch nodes, and continuing "down" the height of the tree until a leaf node is reached. The key is compared to the contents of the leaf node, and one of the pointers in the leaf node is used to fetch the desired data record (if one exists).

In the most simple B-tree, each node contains one search key and two associated pointers. Such a tree structure, sometimes referred to as a binary tree, theoretically provides a very efficient search method. If the number of nodes in this type of tree is equal to or less than $2^n$, then only "n" searches are required to locate a data record pointer in any leaf node.

In practice, a simple binary tree is inefficient. Most data bases are stored on relatively slow storage systems, such as magnetic disks. The time required to access any item of data (such as a tree node) on such a storage device is dominated by the "seek" time required for the storage unit to physically locate the desired storage address. Following each seek, the contents of a node may be read into the high-speed memory of the computer system. In a simple-binary tree, for each access of a node, only a two-way decision (to the left or right branch from that node) can be made since the node contains only one search key. If, instead of containing only one search key per node, a node contains several search keys, then for each seek operation, several keys will be read into the high speed memory of the computer system. With one search key per node, a comparison and determination can be made that the item sought for is in one half of the remainder of the tree. With "$n-1$" search keys per node, the search can be narrowed to "$1/n$" of the remainder of the tree (for example, with 9 search keys per node, a search can be narrowed to 1/10 of the remainder of the tree). This type of structure is known in the prior art as a "multiway" tree.

It is advantageous to have as many search keys as possible per node. Thus, for each seek of a node, several search keys can be examined and a more efficient determination can be made as to the location of the next node or, in the case of a leaf node, of a data record. The height of the tree, and hence the search time, is dramatically decreased if the number of search keys per node is increased.

A very efficient method of searching large storage disk-based key indexes based on this concept is described in U.S. Pat. No. 4,677,550, entitled "METHOD OF COMPACTING AND SEARCHING A DATA INDEX", which issued on Jun. 30, 1987 to the inventor. By the use of a tree structure called a "Bit-tree", the search keys in leaf nodes are compacted such that a much larger percentage of the key records of the tree structure are located in leaf nodes. Searching for a data record is accomplished in essentially the same manner as for B-trees, but the height of the search tree is substantially reduced, permitting faster fetching of the desired data record.

Although B-trees and Bit-trees represent efficient methods of searching for data records, both methods require initial generation of the tree structure itself. A necessary operation needed for maintenance of an existing tree structure of either type is the ADD RECORD operation (which actually adds to the tree a key record), the methods of which are well known. Therefore, a tree can be initially built simply by "adding" a first key record to an empty tree, then sequentially adding further key records until all key records have been added to the tree.

It is known that a tree can be built much more efficiently if the key records are initially physically sorted in the order of their key field than if the records are in random order. Therefore, it is common for many systems to physically sort sets of key records first, and then build a tree based on keys extracted at intervals from the sorted key records.

Sorting of key records for large data bases (i.e., data bases that require storage outside of the main memory of a computer) is typically accomplished in a two-step process. First, the data records are read and key records formed and stored in memory. The key records are "pre-sorted" within the memory and then written out to a storage system as a sorted "string" of key records, typically into an unused portion of the storage system. This production of sorted strings continues until all of the original data records have been read and their key records sorted into one of such strings. Examples of such strings are shown in FIG. 2, labeled as "input strings".

After the generation of all necessary strings, at least two strings at a time are read back into memory and then merged into sorted order (this example is of 2-way merging; it is known in the art to extend this concept to N-way merging). An example of this process is diagrammatically shown in FIG. 2. The merged string is then written out to the storage system. Such merging continues for subsequent passes until only a single, sorted string remains that contains all of the key records.

This process of building a tree by physically sorting key records and then adding the sorted key records to the tree structure is inefficient when considered in light of the desired result. The goal is to build a tree; the ideal method would be to directly build the tree more efficiently than with the two-step "sort and add" method, or with the simple sequential addition method. In addition, the prior art generally teaches that to sort a data file having "N" records, the storage system must have space available to store "2N" records during the sorting process.

The present invention accomplishes this goal by means of a new sorting method that sorts extracted key records into a linked list structure that can be directly transformed into an index tree. The inventive sorting method also may be used simply for sorting large sets of data records in place on a computer storage system.

It is also known in the prior art to compress key records after sorting the keys and before (or during) tree building for the purpose of decreasing their size. One method of compression is described in U.S. Pat. No. 4,677,550 referenced above. Two other means commonly used for compressing key records are prefix compression and suffix compression.

All of these compression techniques are employed after sorting the key records. For prefix compression and suffix compression, similarities between the leading characters and the trailing characters, respectively, of ordered search keys are exploited to reduce the size of the search key, thereby making it possible to increase the number of search keys in a node.

Prefix compression reduces the number of characters in a search key by eliminating leading characters of a key that are common to a preceding search key. For example, if two adjacent search keys are "MAYER" and "MAYERS", the leading characters, "MAYER", can be eliminated from the second search key and replaced by an indication of the number of leading characters so eliminated. Hence, the second search key could be replaced with the compressed search key "5,S". Conventionally, the number "5" is placed in a separate prefix field ("P-field") in the compressed search key record.

The number "5" in the P-field indicates that the first 5 characters of that search key are identical to the first 5 characters of the preceding search key. Thus, the current search key can be completely reconstructed by reading the first 5 characters of the preceding search key.

Suffix compression eliminates trailing characters which are unnecessary for determining the relative position of a search key among other search keys. For example, if a first search key is "TIMECLOCK" and the next ordered search key is "TIMESHARE", the second search key can be truncated just after the first character ("S") that distinguishes the second key from the first key. That is, the second search key can be compressed to "TIMES". Conventionally, the size of the remaining key is placed in a separate suffix field ("S-field") in the compressed search key record for ease of computing the length of the key record.

Using both prefix and suffix compression techniques, the search key "TIMESHARE" following the search key "TIMECLOCK" could be compressed to "4,1,S", yielding a savings of 6 characters.

As noted above, suffix compression and prefix compression are conventionally done after key sorting, during the tree-building stage. The prior art three-step process (sort, compress, and tree build) required when key records are to be compressed is an inefficient means to achieve the goal of creating a tree with compressed search keys in each node. It would be desirable to improve the efficiency of this process.

The inventive sorting and compression method integrates compression of key records into a new sorting method to yield greater efficiency, and thus overcome the limitations of the prior art.

SUMMARY OF THE INVENTION

The inventive sorting method uses substrings to sort strings of key records into a linked list structure that can be directly transformed into an index tree. A substring is defined as a portion of a pre-sort string small enough to fit within a reserved memory work space, or "buffer". Each substring has a substring field that contains a pointer to a next substring.

The first part of the inventive method is similar to the pre-sorting process of the prior art, in that key records are initially extracted from data records, placed into memory a portion at a time, and sorted by any convenient method. A buffer size is determined for subsequent merge passes, based on the merge order and available memory space. As each sorted string is written out, a substring field is inserted at intervals to delimit the output string into substrings (alternatively, the substring fields are stored in a separate file that maps the output strings into substrings). Initially, the substring field of each substring points to the next sequential substring (the substring field of the last substring may be set to point to nil, for example). In like manner, the entire original data file is read, key records extracted and sorted, and the sorted key records written out as substring-delimited strings.

During the merge phase, equal-length buffers are allocated in the computer's memory: N input buffers (where N is the merge order), and an output buffer. N substrings from separate strings are read from the storage system into the N input buffers. A "slot table" is created to keep track of the areas of the storage system (called "substring slots") from which the substrings were read and which are now available for storage of output data.

Merge comparisons are performed on the contents of the input buffers, with sorted output records being stored in the output buffer. When the output buffer becomes full, it is written out to one of the available substring slots as a new substring. The substring field of the newly written substring is updated to point to the next available substring slot (which may be in any of the strings), determined from examining the slot table. When one of the input buffers is empty, the next substring is then read from the string that corresponds to that buffer (if a string is exhausted before the other strings, a next string may be accessed for substrings, so that no input buffers are left empty and idle). The slot table is updated to indicate that the substring slot of the newly-read substring is available.

The merge process continues through enough passes until all strings have been merged. The result is a logically linked-list of substrings of sorted key records (although the physical order of the linked substrings may be random).

In terms of a tree structure, the substrings are formatted as "leaf nodes", in that they comprise keys and pointers to records. To complete the upper levels of the tree structure, back to a root node, the logically sorted substrings are read in order from the storage system into memory, and a table of branch node key records is built up by reading key records from the substrings at node-sized intervals. A pointer to each such key record is determined and stored in the branch node table with the search key from the key record. When the branch node table is full, it is written out to the storage system, and a new branch node table is begun. The process is continued until all substrings are read. The process is then repeated, except that the first level of branch nodes are read from the storage system into memory and a second level of branch nodes are constructed. The process continues until a single root node is constructed. The tree structure is then complete.

As an option, several levels of branch node tables can be constructed simultaneously. This approach requires fewer storage system accesses of constructed branch nodes, and hence is generally faster.

As an option, the logically sorted substrings can also be physically rearranged in place so that the physical order of the key records matches the logical order.

The invention thus permits the creation of a tree structure directly from the results of the sorting process, without having to physically sort the key records and then construct a tree structure. In addition, the invention permits the logical and physical sorting of large sets of data records in place on a storage system.

As an enhancement to the inventive sorting method, compression of key records is integrated into the sorting process. A first pass at prefix compression is performed during the pre-sort phase, when the original strings are initially sorted and divided into substrings, and before the strings are written out to the storage system.

Later, as the merge comparisons are performed on the contents of the input buffers, each search key is further compressed by prefix compression, if possible. By compressing each search key written to the output buffer during the merge process, more search keys can be stored in the output buffer before it becomes full. Therefore, the number of writes from the output buffer to the substring slots of the new string are reduced. In addition, fewer read operations are required in subsequent merge phases because reducing the size of the search keys reduces the size of each string. Hence, the total number of input/output (I/O) operations is reduced during the merge/compress phase.

When the last N strings are being merged, both prefix compression and suffix compression are performed on each search key before the key is stored in the output buffer. Therefore, each substring that is written from the output buffer to the next available substring slot is completely compressed. Compressing the search keys of the substring in the output buffer before writing the substring to the storage system reduces the rate at which the output buffer fills, and consequently reduces the number of I/O operations between the output buffer in the computer's memory and the storage system.

This aspect of the present invention substantially reduces the time required to build a tree by compressing search keys during the pre-sort and merge phases rather than as a separate step after the keys are ordered. The reduction in time is a result of fewer I/O operations compared to the prior art. This aspect of the invention thus provides a significant enhancement to the efficiency of the inventive sorting method.

The details of one embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Figure 1:
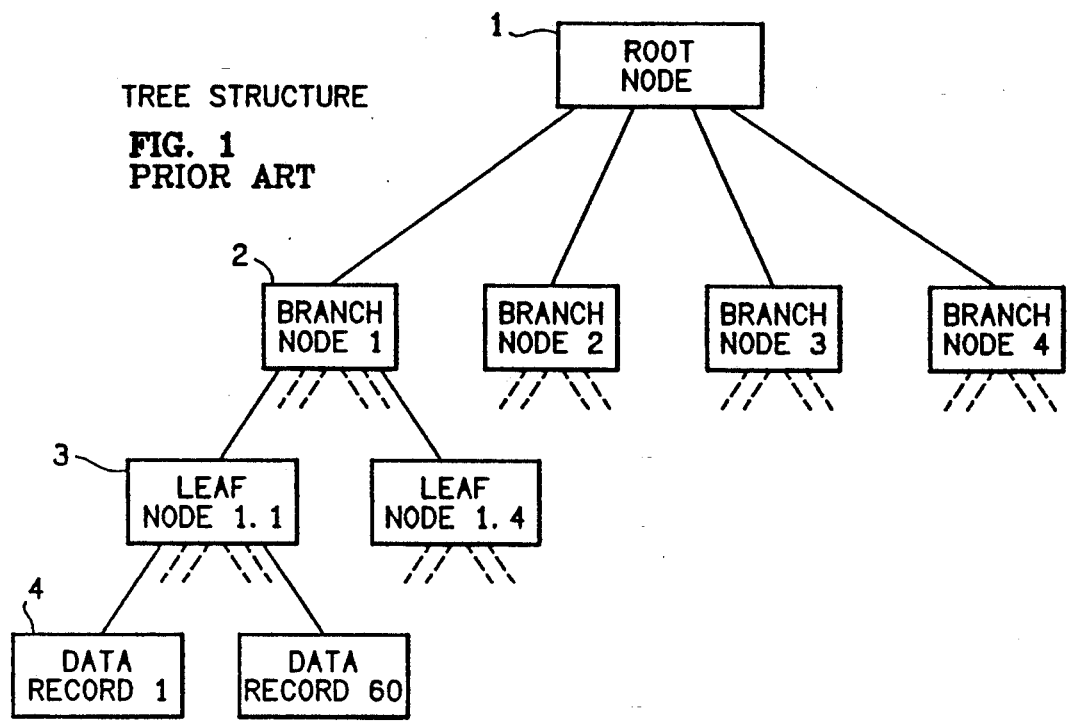
FIG. 1 is schematic diagram of a tree structure for indexing data records stored in a computer storage system.

Throughout this description, the preferred embodiment and examples shown should be considered as exemplars, rather than limitations on the method of the present invention.

The inventive sorting method is primarily designed for use with large data files containing more data than can fit into a computer memory at one time. The inventive method is carried out in two phases, consisting of a pre-sort phase (similar to the prior art), followed by one or more merge passes that take advantage of the concept of a "substring".

In the pre-sort phase, a file of data records on a storage system is read and key records are extracted in known fashion. A pre-sort buffer space is provided in a computer memory for storage of enough key records to fill the pre-sort buffer. For the pre-sort phase of the sorting process, most of the working space available in the computer memory can be used as a pre-sort buffer to read in and sort key records. The key records in the pre-sort buffer are sorted by any convenient fashion, such as a tree sort or a quick sort. Examples of such sorting techniques are given in Knuth, *The Art of Computer Programming*, Vol. 3. In the preferred embodiment of the invention, the pre-sort comparisons are based upon both the extracted search keys and their associated record pointers (which are preferably relative record numbers). In the preferred embodiment, the output string generated by each pre-sort pass is approximately equal in size to the size of the pre-sort buffer.

After the data in the pre-sort buffer is sorted, it is written back to the storage system. However, as the sorted key records are written out onto the storage system, a "substring field" is inserted at intervals in the data string to delimit the output string into substrings. (Alternatively, the substring fields are stored in a separate file that maps the output strings into substrings—that is, the first substring field of the map file corresponds to the first physical substring storage area, and so forth). The substring field of each substring initially points to the location of the next sequential (physically and logically) substring. The substring field of the last substring is set to a specified value to designate that it does not point to a subsequent substring. In the preferred embodiment, the substring field is 3 bytes long, which permits sorting of over 16,000,000 records.

A substring is defined as a portion of a pre-sort string small enough to fit within a merge phase buffer. The optimum size of a merge phase buffer is calculated by determining the amount of working space, W, available in the computer memory for merging (after other needed work space is allocated), and determining a desired merge order (for example, a 2-way merge or a 4-way merge). The merge order determines the number of input buffers necessary to receive input substrings during the merge phase of the sorting process. In addition, an output buffer of equal length to the input buffers must also be reserved. Thus, the substring length $L_s$ is equal to:

$$L_s = W \div (N+1)$$

Accordingly, if a 4-way merge is desired, and the amount of available working space, W, is 500,000 bytes, then the optimum substring length will be 500,000÷(4+1), or 100,000 bytes.

Figure 3:
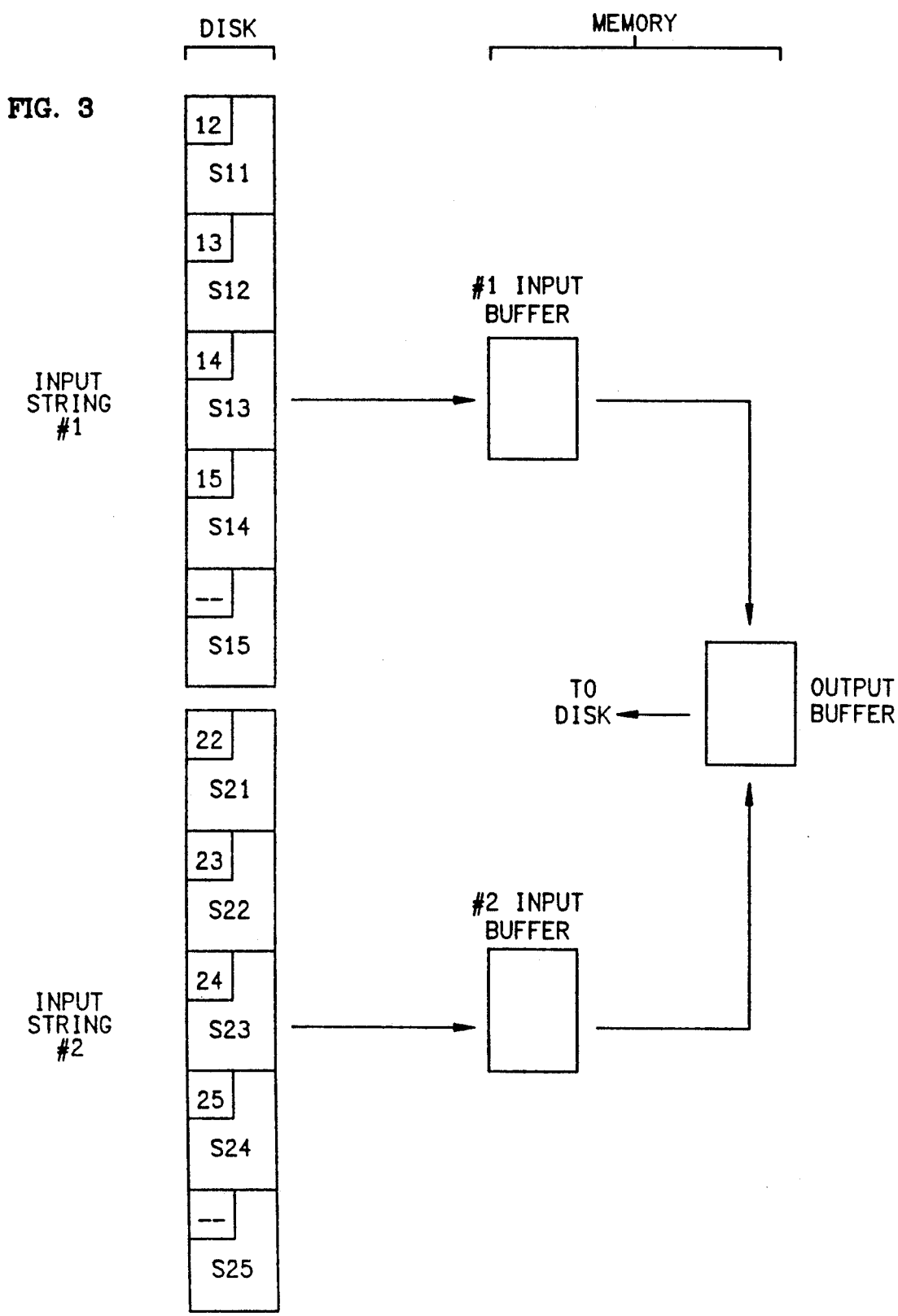
FIG. 3 is a schematic diagram showing the initial stage of the substring merge sequence of the present invention.

FIG. 3 shows diagrammatically two input strings that had been subdivided into substrings. Input string #1 in FIG. 1 comprises 5 substrings (labeled S11 through S15). The substring fields are shown diagrammatically in FIG. 3 as a small block at the top of each substring. The value of each substring field is the location of the next substring. Thus, for substring S11, its substring field initially points to substring S12. Similarly, the substring field of substring S12 initially points to substring S13. After the original data file has had its key records extracted and pre-sorted into a plurality of output strings (each of which has been subdivided into substrings), the merge phase of the inventive method begins.

In the merge phase, the available working space of the computer memory (after other needed work space is allocated) is divided into N+1 buffers, where "N" is the order of the merge. N of the buffers are used as input buffers, and the remaining buffer is used as an output buffer. For example, if a 2-way merge is performed, 3 buffers are allocated; if a 4-way merge is performed, 5 buffers are allocated. Each buffer is optimally sized to store a substring.

FIG. 3 diagrammatically shows 2 input strings stored on a disk, and 3 buffers that have been allocated in the computer system memory. The example shown in FIG. 3 is for a 2-way merge; in the preferred embodiment, a 3-way or 4-way merge is preferred as more efficiently utilizing computer resources by minimizing the number of input/output operations. (It is important to attempt to minimize input/output operations, since such operations require substantially more time than typical operations done within a computer's memory). The example shown in FIG. 3 is therefore a somewhat simplified explanation. However, it would be well within the skill of a practitioner in the art to apply the 2-way merge example to N-way merging.

Figure 4:
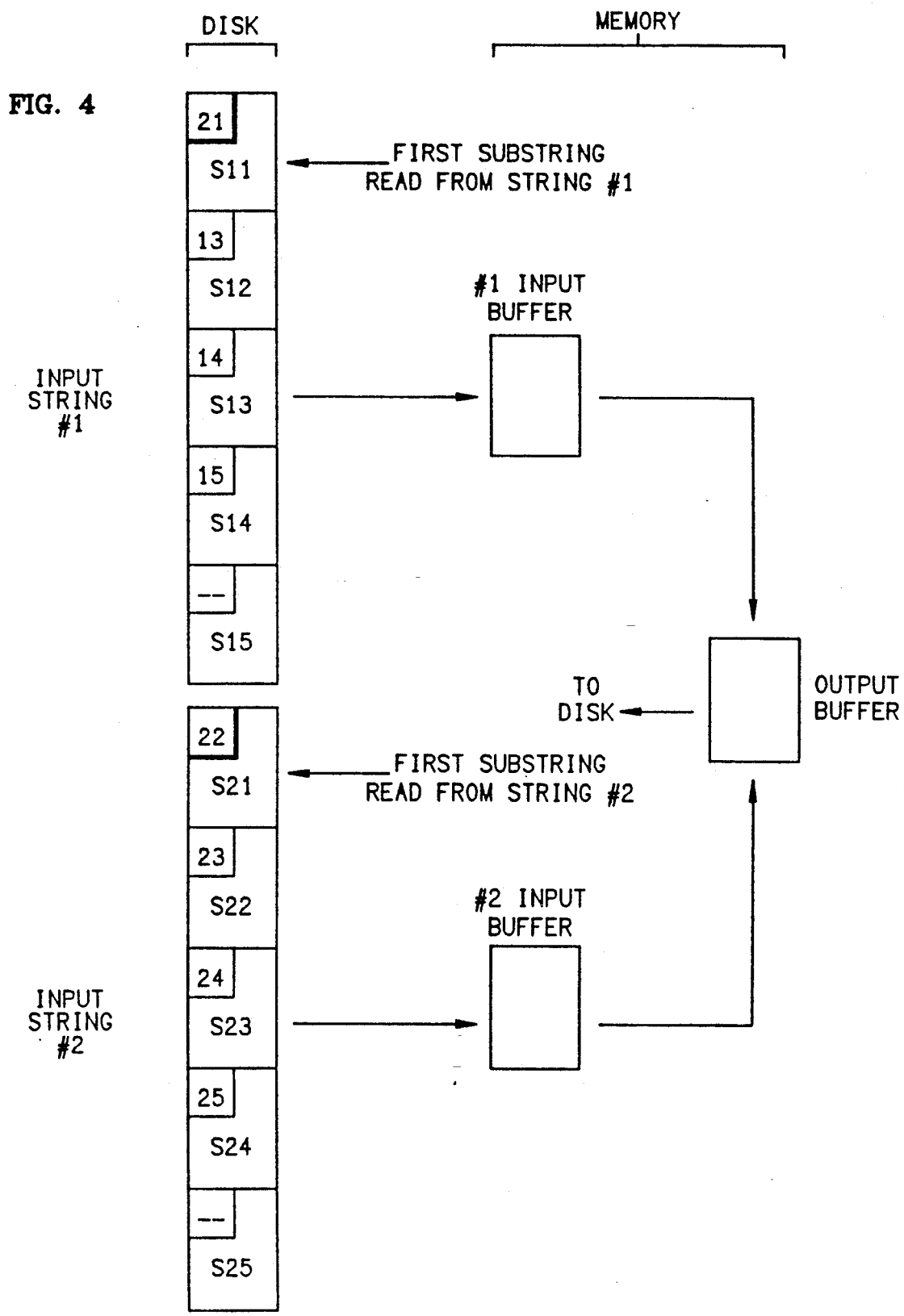
FIG. 4 is a schematic diagram showing a second stage of the substring merge sequence of the present invention.
Figure 5:
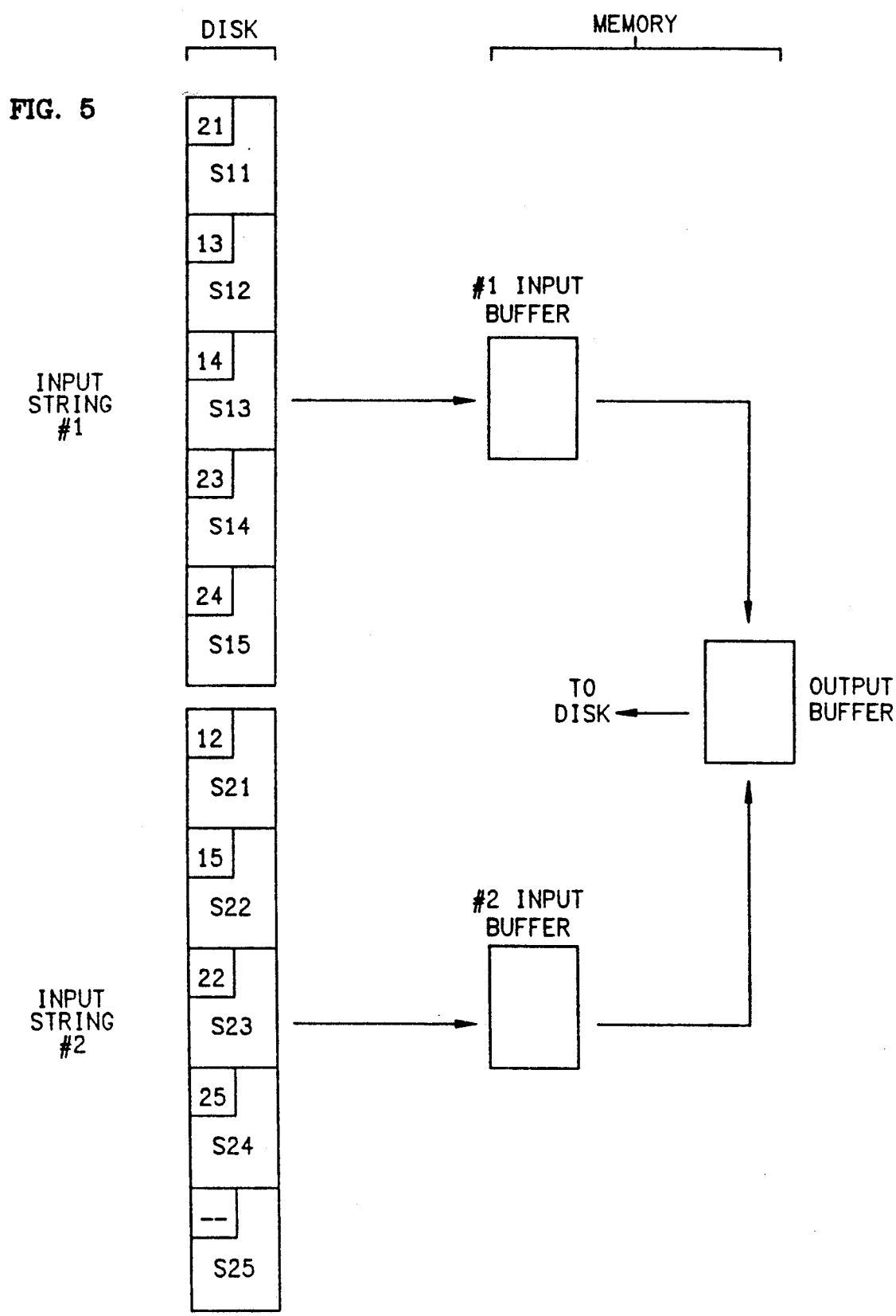
FIG. 5 is a schematic diagram showing the final stage of the substring merge sequence of the present invention.

FIGS. 3–5 diagrammatically show different phases of a 2-way merge process in accordance with the present invention. The initial state of the merge process is shown in FIG. 3. Substrings are read from the storage system into associated input buffers reserved in the computer memory. The key records in the input buffers are then compared against each other in order to determine their relative order. In the preferred embodiment of the invention, the merge comparisons are based upon both the extracted search keys and their associated record pointers (which are preferably relative record numbers).

As a result of each comparison, a record from either input buffer #1 or input buffer #2 is stored in the output buffer. Thus, for example, if input buffer #1 held key records having the keys "ABGH", and input buffer #2 held key records having the keys "CDEF", then after the first 4 comparisons, the output buffer would hold key records having the keys "ABCD".

As each substring is read from an input string into its associated input buffer, a "slot table" is updated to keep track of the areas of the storage system (called "substring slots") from which the substrings were read. The slot table may be implemented in a number of ways, including a first-in/first-out data stack. The slot table thus indicates which substring slots are available for storage of output data. For instance, during the first pass of the merge phase of the example set forth in FIGS. 3–5, substrings S11 and S21 are initially read from the storage system into associated input buffers reserved within the computer memory. Therefore, the slot table is updated to indicate that substring slots S11 and S21 are available for storage of output data. (This is graphically shown in FIG. 4 by the double lines shown around part of the substring field of substring slots S11 and S21).

Merge comparisons are performed on the contents of input buffer #1 and input buffer #2, with the sorted output records being stored in the output buffer. When the output buffer becomes full, it is written out to one of the available substring slots (determined from examining the slot table) as a new substring. The substring field of the newly written substring is updated to point to the next available substring slot (also determined from examining the slot table). The next available substring slot may be in any of the strings.

Thus, for example, if the first buffer full of data from the output buffer is written back to substring slot S11, the next available substring slot would be substring slot S21 (from which the first substring from input string #2 was read). Therefore, the substring field of the newly written substring stored in substring slot S11 would be changed from "12" (shown in FIG. 3), to "21" (shown in FIG. 4). When the next buffer full of output data is written from the memory to the storage system, it would be written into substring slot S21. The substring field of substring slot S21 would be updated to point to the next available substring slot, as determined by examining the slot table.

In implementing the invention on some computer systems, the last substring generated during the pre-sort phase may be physically shorter than the other substrings, resulting in the substring being written to a short substring slot. In order to ensure that the contents of the output buffer will fit within each available substring slot, the short substring slot must always be written last in each merge pass in which it is encountered. This poses no basic difficulties in implementation.

When one of the input buffers is empty, the next substring is then read into the buffer from the string that corresponds to that buffer. If a string is exhausted before the other strings, a next string may be accessed for reading substrings, so that no input buffers are left empty and idle. As each substring is read from the storage system into an input buffer, the slot table is updated to indicate that the substring slot of the newly-read substring is available for storage of output data.

The above process is repeated as many times as necessary on each of the original pre-sorted strings, and thereafter on each remaining set of logically linked substrings, until only a single, logically linked, sorted set of substrings has been written to the storage system. At this point, the merge phase is complete. For example, if, after the pre-sort phase, 64 sorted strings have been written to the storage system, after one pass of a 2-way merge, not more than 32 sets of linked, logically sorted substrings would have been written to the storage system. After a second pass, no more than 16 sets of linked, logically sorted substrings would have been written to the storage system. In this example, the original 64 pre-sorted strings would have been sorted and logically linked after at most 6 passes.

FIG. 5 depicts the final stage of the substring merge sequence shown in FIGS. 3-5. Each of the substring slots of input string #1 and input string #2 have been filled with new, sorted output data from the output buffer. The substring field of each substring now points to the next substring in logical, sorted order. The area on the storage system formerly occupied by input string #1 and input string #2 now comprises a set of logically linked substrings.

It should be noted that the sort was conducted entirely "in place" in that no working space was set aside on the storage system to temporarily store output data. All processed data is written back into the same storage system area from which the data was originally read.

The inventive method therefore provides a way of sorting very large databases. This is very useful, for example, when sorting data on a storage system that has no excess storage space available. (Frequently in the prior art, it is necessary to have a working space on a storage system equal in size to the original data file; thus, the data file and the working space together are twice as large as the original data file). The invention therefore virtually guarantees that a sort of a data file can be performed.

Figure 2:
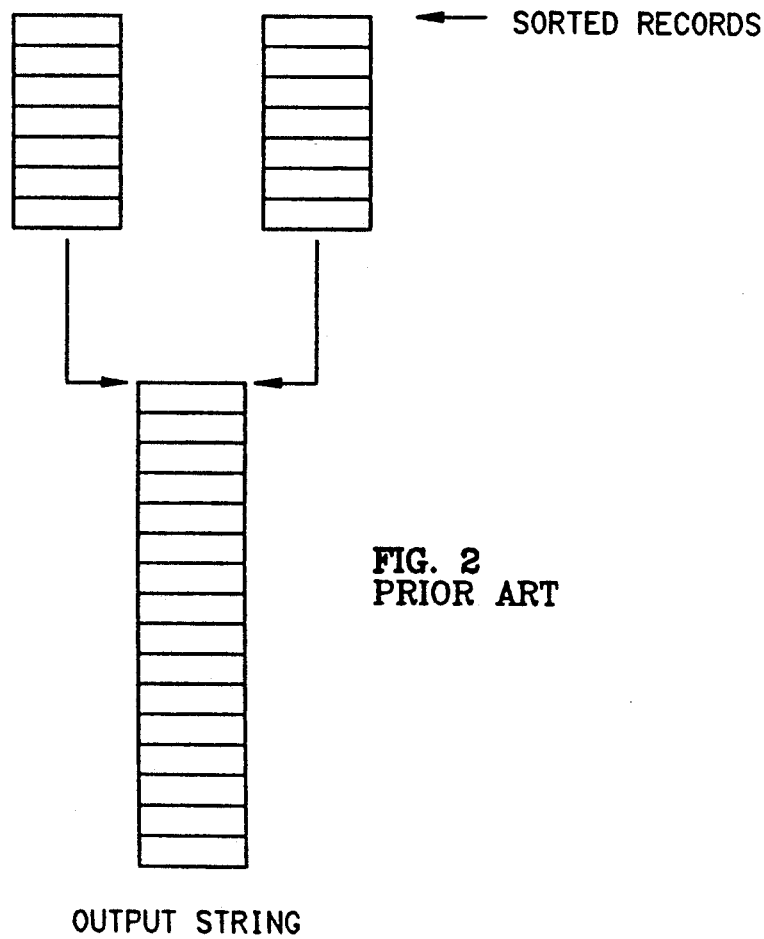
FIG. 2 is a schematic diagram showing a prior art merge sequence.

The division of pre-sort phase output strings into substrings and the merging of substrings, rather than strings, contrasts with the prior art method of merging, which is diagrammatically shown in FIG. 2. In the prior art, N pre-sorted input strings (for example, 2 strings for 2-way merging) are read into buffers in a memory and merged, forming an output string that is as long as the sum of the input strings. Thus, in FIG. 2, input strings S11 and S12, after merging, form output string S21, which is equal to the sum of the lengths of the input strings S11 and S12. This prior art technique precludes sorting of data files "in place", and requires more input/output access time and merge comparison time, since the data file is physically sorted rather than simply logically sorted.

It should be noted that if the invention is implemented such that a full output buffer is written to the storage system before an empty input buffer is filled from the storage system, then under certain circumstances, all available substring slots will be filled before an empty substring slot is created by reading a substring from the storage system into an input buffer. In this situation, in order to determine the value of the substring field for the last-written substring (which must point to the next available substring), either the next substring to be read is determined (but not read until after the output buffer is written), thereby identifying a substring slot that will become the next available slot, or the last key records of the substrings in the input buffers are compared before they are merged. The substring having a last element with the smallest key value will be exhausted first and therefore the next substring to be read into that buffer will come from the same string, thereby determining which substring slot will become the next available slot.

Although the invention has been described in terms of sorting key records extracted from data records, it should be understood that the inventive sorting method can be conducted on the data records themselves, rather than on key records alone. Thus, the inventive sorting method may be used with any sortable data file.

As noted above, it is not necessary to physically sort the final set of logically linked substrings generated by the inventive method. This is particularly so when the ultimate purpose of the sorting is to build a tree structure.

The sorted substrings are essentially the same as leaf nodes of a tree structure, in that they comprise search keys and pointers to records. Therefore, all that need be done is to treat the linked list of substrings as a set of nodes (preferably corresponding in size to a typical unit of data storage on a storage system, such as a sector, cluster, or block, thereby making input/output operations more efficient), and to create branch nodes which contain search keys and pointers to such leaf nodes.

Branch nodes are constructed by allocating a table in the computer memory for storing search keys and pointer values. A buffer is also reserved in the memory for storing key records from the set of logically sorted substrings. In the preferred embodiment of the invention, the buffer size is a multiple of the node size, for convenience. (For example, if a node size equals 8 sectors, then the buffer size could be made, for example, 5 times larger, or 40 sectors).

The sorted key records are sequentially read from the logically linked list of substrings into the buffer. At intervals corresponding to the node size, a search key is read and stored in the branch node table, along with a pointer (such as a relative node number) to the storage system location containing that node. This process is repeated for all of the key records in the buffer.

Figure 6:
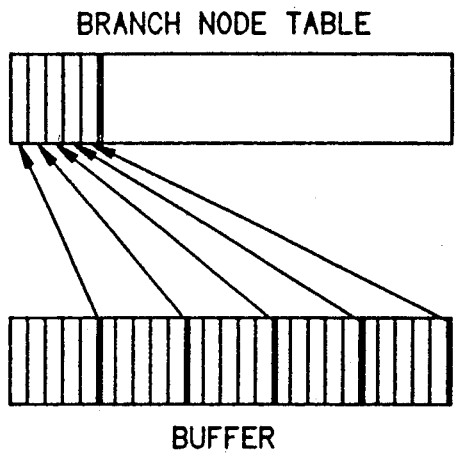
FIG. 6 is a schematic diagram showing one tree node linkage process for the present invention.

This process is diagrammatically shown in FIG. 6, which shows a buffer containing 25 records. If the node size is established at 5 records (designated by the double wide line every 5 "records" in the sorted substring shown in FIG. 6), then the search key value from every fifth record is stored in the branch node table, along with a pointer to the node containing the associated lower level node. When the buffer has been processed, a next buffer full of records are read into the buffer and processed in a similar fashion. The branch node table may be established as having a length equal to a node size, or, as shown in FIG. 6, a length equal to several nodes.

When the branch node table is full, it is written to the storage system, and a new branch node table is begun. The process is continued until all substrings are read and a first level of branch nodes has been created. The entire process is then repeated, except that the data read into the buffer comprises the first level of branch nodes, and the branch node table is used for creating a second level of branch nodes. The process continues until a single root node is constructed having pointers to lower level branch nodes. The tree structure is then complete.

Figure 7:
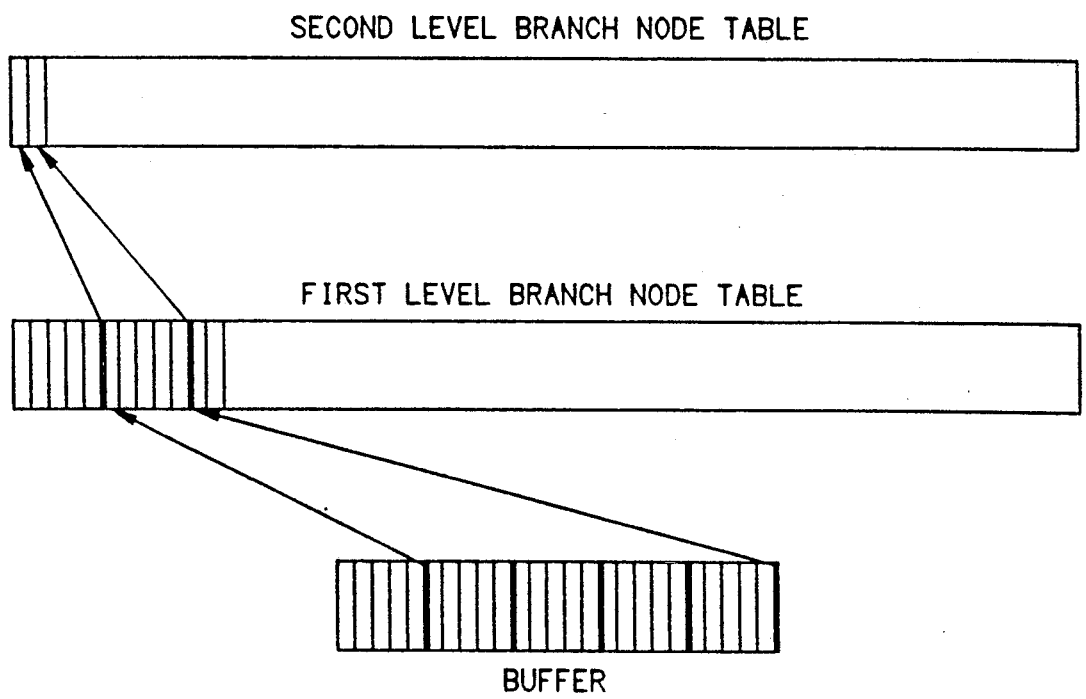
FIG. 7 is a schematic diagram showing an alternative tree node linkage process for the present invention.

If sufficient storage is available, several levels (or all levels) of branch node tables can be constructed simultaneously. This approach requires fewer storage system accesses of constructed branch nodes, and hence is generally faster. This alternative method is shown diagrammatically in FIG. 7, in which a first level branch node table and a second level branch node table are allocated in the computer's memory. When the first level branch node table becomes full (or, optionally, as a node-size number of key records have been created), a search key from each node-size portion of the first level branch node table, along with a pointer to the associated first level branch node, are stored in a second level branch node table. As FIG. 7 shows, the growth of the second level branch node table is substantially slower than the growth of the first level branch node table. This alternative method has advantages, in that the first level branch nodes do not have to be read back from the storage system in order to construct the second level branch node table. If desired, further branch node tables for the third and subsequent levels can be allocated and used in like fashion as the second level branch node table.

If desired, as the key records are read into the buffer, their search keys may be transformed in accordance with the teachings of U.S. Pat. No. 4,677,550 (referenced above) into distinction bits. This post-sort compression technique substantially increases the number of key record pointers per node, and reduces the number of branch nodes required to complete a tree structure from leaves to root.

As an added feature of the invention, once the logically linked, sorted substrings have been written to the storage system, it is possible to physically order the substrings to conform to the logically sorted order. A number of sorting techniques can be used to physically sort the substrings. In the preferred embodiment, the set of substrings are physically sorted in place by reading the substrings in physical order into a pair of memory buffers. After the first substring is read into a first input buffer, its substring field is examined to determine a target substring slot corresponding to the proper physical order for that substring. The substring located in the target substring slot is read into a second input buffer, after which the first substring is written into its proper physical place.

This process of "swapping" continues in like manner, with each substring being read into a buffer, its correct physical substring slot determined, and then being written into that slot after the contents of that substring slot have been read into a memory buffer. For example, referring to FIG. 5, substring slot S11 would be read first and its proper location (substring slot 21) determined by examining its substring field. The substring in substring slot S21 would then be read into a second buffer, while the substring that was in substring slot S11 is written to substring slot S21. The substring that was in substring slot S21 belongs in substring slot 12. Therefore, the substring that was in substring slot S21 is written from the buffer into substring slot S12 after the contents of substring slot S12 are read into a buffer.

It should be noted that the physical sorting described above is not necessary to implement a tree structure, which is a principal objective of the present invention. However, physical sorting of the type described is useful in certain circumstances to reduce input/output latency due to the fact that logically adjacent substrings are not physically adjacent, and therefore extra rotational time may be necessary in order to read a series of the logically connected substrings. Further, if the search keys of the key records are compressed into distinction bits, the degree of compression is so great that physically sorting the compressed substrings may free up a substantial amount of storage space on the storage system of particular computer systems.

Compression of Keys

With respect to the compression aspect of the present invention, in the preferred embodiment, the key records in each string are pre-sorted and divided into substrings, as described above. Each substring is then compressed by any method known which does not cause information to be irretrievably lost. Prefix compression is one such method, and is performed in known fashion. Since all search keys for a file are not available during the pre-sort phase to be compared for purposes of ordering and compression, irreversible compression techniques (such as suffix compression) cannot be used.

Compression at this stage can be done only on the search keys, or on both the search keys and their associated record pointers (which are preferably relative record numbers).

Figure 8A:
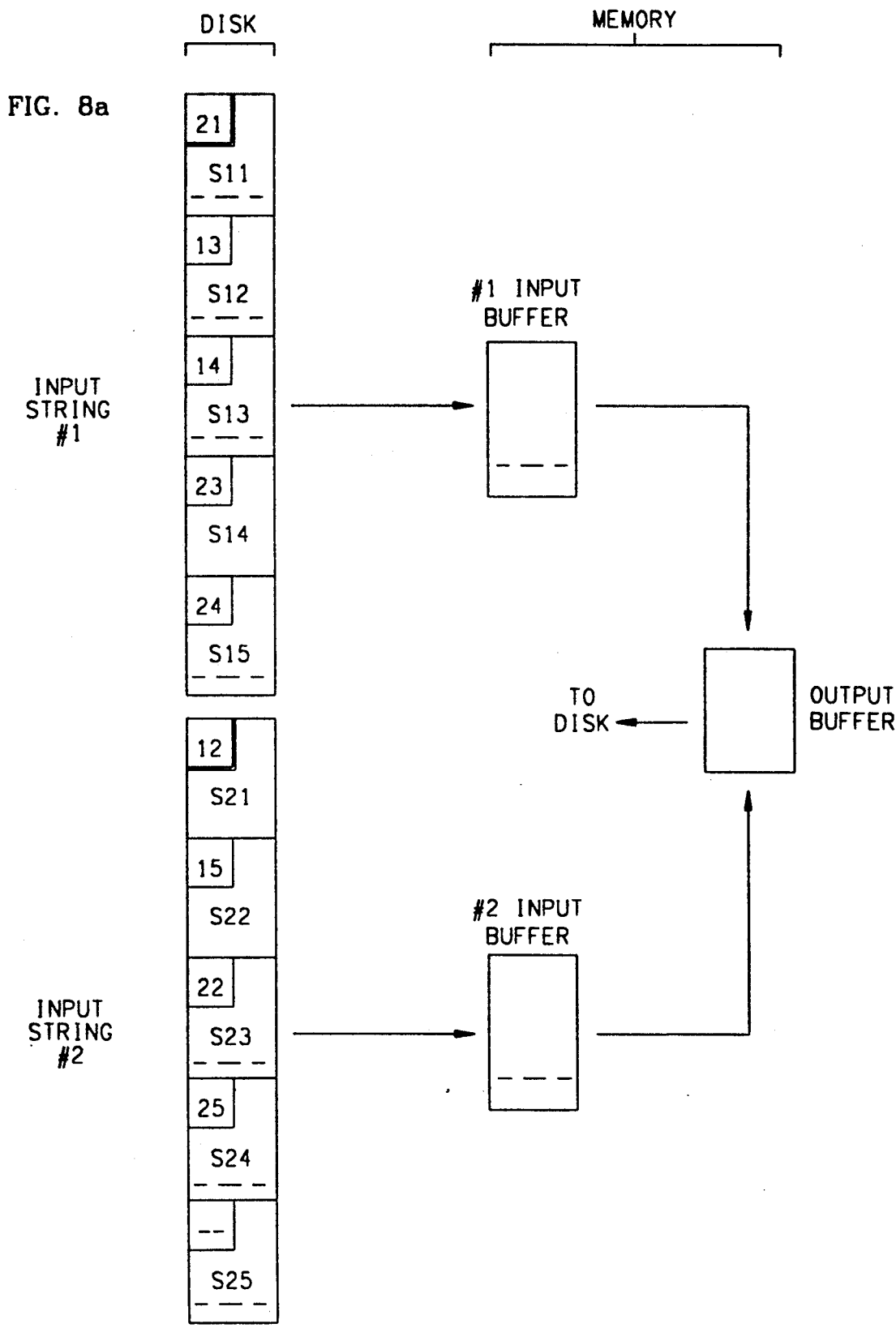
FIG. 8a is a schematic diagram showing the initial stage of the substring merge sequence of the present invention after compression of the presorted string.

Each sorted and compressed pre-sort phase string is generally (although not always) smaller than the unsorted and uncompressed string that was read from the storage system. FIG. 8a graphically depicts two pre-sorted strings on the left. Each compressed substring within a string is shown with a broken line at the bottom indicating that the amount of space occupied by the compressed substring (i.e., the space above the broken line) is less than the space that would otherwise be occupied by the uncompressed substring. As noted above, not all of the substrings can be compressed at this stage. For example, substring S14 might contain search key values AABB, DDEE, and GGHH, which cannot be compressed using prefix compression. On the other hand, substring S11 might contain search key values AAAA, AAAB, and AAAZ; the latter two entries can be compressed to "3B" and "3Z", with "3" being the P-field value.

The methods for implementing prefix compression are well-known in the art, since they only require comparing two ordered search keys, character by character, from the first character until a non-matching character is found. The ordinal location of the previous matching character is the value of the P-field for the second of the two ordered keys, and that number of characters can be deleted from the second key.

In the preferred embodiment, prefix compression is employed in known fashion. Therefore, the amount of similarity between the search keys within each substring determines the amount of compression that takes place. In some computer systems, the transfer of the substrings requires only one I/O operation. In such systems there is no savings in terms of I/O operations at this point in the process.

Once a pre-sorted string is compressed, the string is written to the storage system. The pre-sort and compression process is repeated for further original strings of the file to be sorted until all strings are pre-sorted and divided into substrings.

After the pre-sort phase, each string is merged with at least one other string, as described above. However, in accordance with the present invention, further compression is performed during the merge phase before each search key is written into the output buffer into new substrings. The same compression technique used during the pre-sort phase is applied. In the preferred embodiment, prefix compression is used.

Figure 8B:
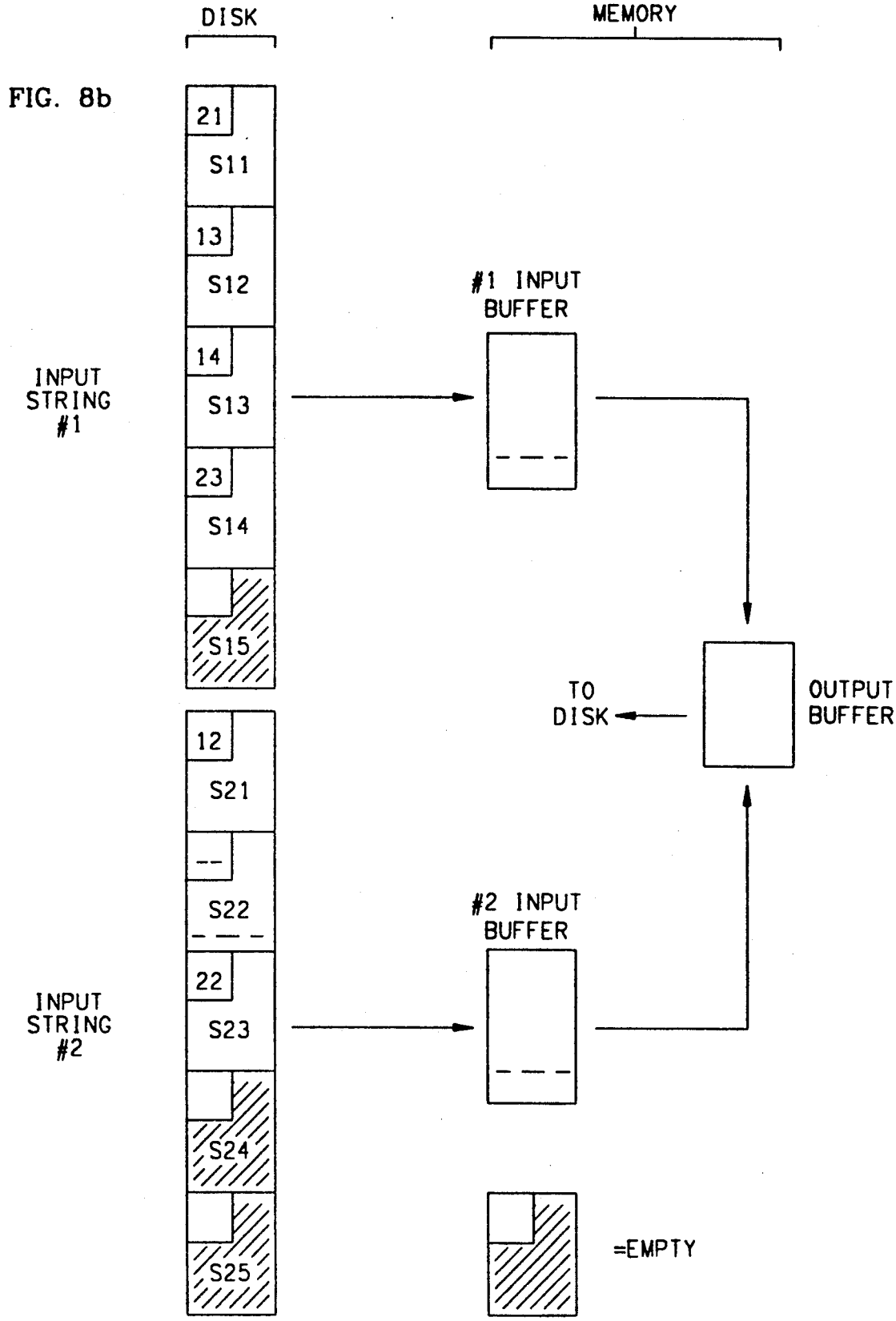
FIG. 8b shows the final stage after substring merge/compression has been completed.

If the substrings in the output buffer are further compressed, the output buffer does not fill as quickly as the input buffers empty. Therefore, the contents of the output buffer does not have to be written out to the storage system as frequently as when no compression is used. As input substrings are merged into the output buffer, the space within each substring that had been saved by compressing each substring after the pre-sort (as depicted in FIG. 8a by the region beneath the broken line within certain input string substrings) is in effect accumulated. When the total amount of space saved equals the length of the output buffer, one I/O operation will have been saved. FIG. 8b illustrates the savings. This is made clear by noting that the output buffer will have filled only seven times in the illustrated example (and therefore write seven substrings to the disk) at the completion of the merge and compression of ten substrings S11–S15, S21–S25.

Another form of reversible compression that can be performed during the pre-sort phase or merge phase is repeated trailing character deletion. That is, if the keys frequently have the same trailing characters (e.g., blanks for text keys, or nulls for other types of keys), then the keys can be further compressed by deleting the identical trailing characters and storing the cardinal number of characters deleted from each key in an "R" (for Repeat) field created for the keys. Since all keys must have an R-field, requiring at least one byte, some files of keys may not benefit from repeated trailing character deletion. Therefore, in an alternative embodiment of the present invention, repeated trailing character deletion is not done during the pre-sort phase, but the keys are scanned for repeated trailing characters and a statistical count is kept for the keys. If the number of repeated trailing characters exceeds the number of keys (and hence the number of required R-fields), then an R-field can be added to each key and repeated trailing character deletion performed during the merge phase. (Note that repeated trailing character deletion can be done independently of suffix compression).

In an alternative embodiment of the present invention, no compression of the search keys is performed until the first merge of the substrings takes place. This will not greatly affect the number of I/O operations required to write the pre-sorted strings to the storage system if each substring is written to the storage system in a single write operation, as is the case in some computer systems. Furthermore, the amount of compression after the first merge will be the same regardless of whether compression is performed in two steps (one step during the pre-sort and one step during the first merge pass) or one step (during the first merge pass).

In the preferred embodiment of the present invention, additional compression techniques can optionally be applied to the search keys during the last merge pass. At this point, compression techniques which may cause information to be irretrievably deleted can be used, since the output buffer will contain, a buffer full at a time, only the final, sorted ordering of all of the search keys. In the preferred embodiment, suffix compression is applied, in known fashion, to the last N strings to be merged.

The methods for implementing suffix compression are well-known in the art, since they only require comparing two ordered search keys, character by character, from the first character until a non-matching character is found. All characters occurring after the ordinal location of the last matching character for the second of the two ordered keys can be deleted from the second key.

Accordingly, in the preferred embodiment of the invention, the substrings that are created in the output buffer during the final merge phase are both suffix compressed and prefix compressed. The amount of compression that occurs in this last merge pass is typically very significant, and substantially reduces the number of I/O operations between the output buffer and the storage system.

Figure 9:
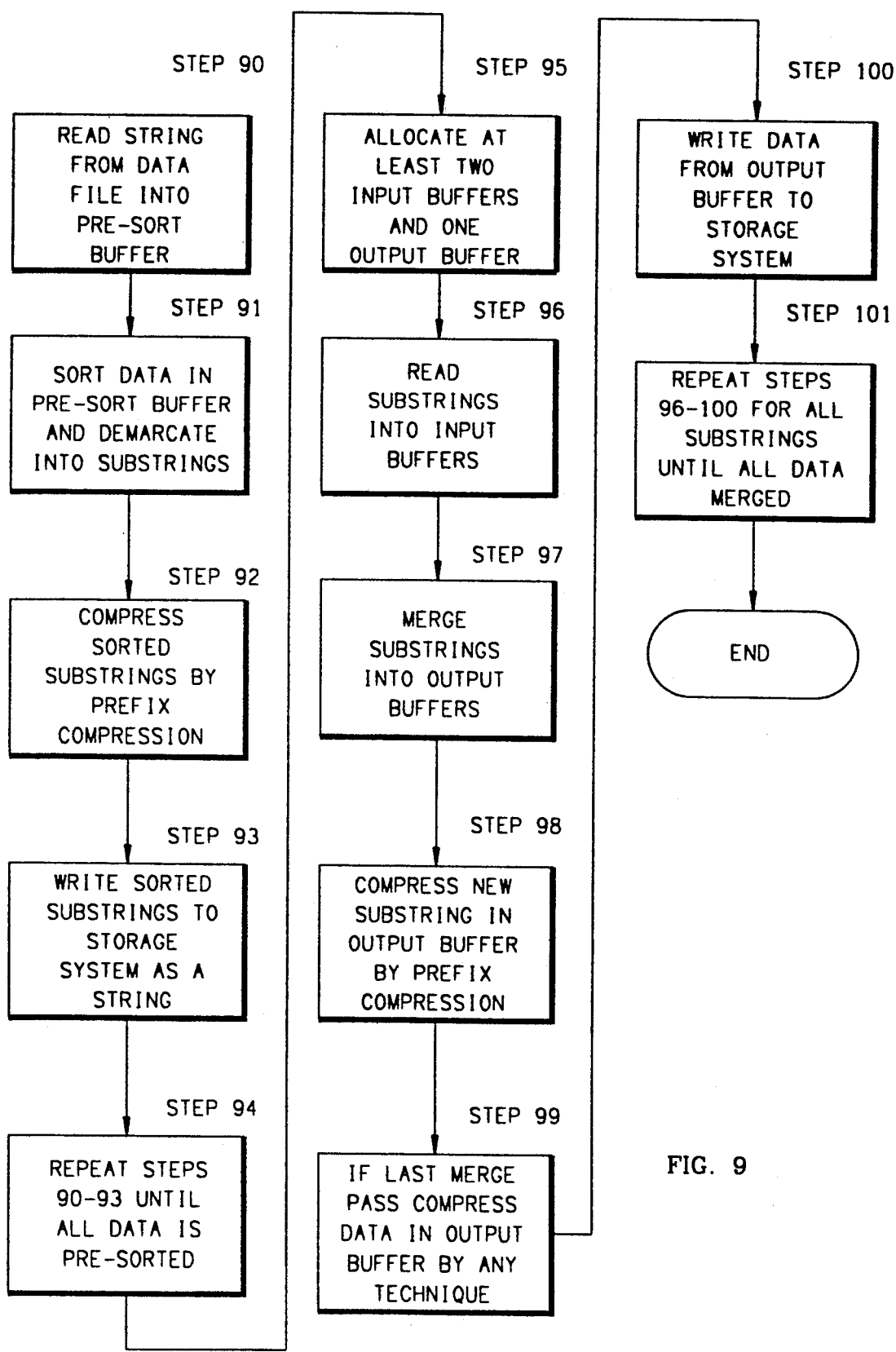
FIG. 9 is a high-level flow chart of the preferred embodiment of the sorting and compression method of the present invention.

FIG. 9 is a high-level flow chart of the sorting and compression method of the present invention. In STEPS 90–94, the original data file is presorted into a plurality of data strings comprising substrings. The individual steps include:

STEP 90: reading an input-buffer amount (a string) of data from the data file on the storage system into a pre-sort buffer;

STEP 91: sorting the data in the pre-sort buffer, and demarcating the string into substrings;

STEP 92: compressing the sorted substrings in the pre-sort buffer by any method which does not cause information to be irretrievably lost, such as by prefix compression;

STEP 93: writing the sorted substrings in the pre-sort buffer to the storage system as a string;

STEP 94: repeating STEPS 90 through 93 for all of the original data on the storage system, thereby generating a plurality of sorted and compressed strings stored on the storage system.

In STEPS 95-101, the pre-sorted strings are merged into a single sorted and compressed file. The individual steps include:

STEP 95: allocating in the computer memory at least two input buffers and one output buffer;

STEP 96: reading a substring from at least two sorted and compressed strings into a corresponding input buffer;

STEP 97: merging the substrings in the input buffers into sorted order and storing the merged data in the output buffer as new substrings;

STEP 98: compressing the substrings in the output buffer by any method which does not cause information to be irretrievably lost, such as by prefix compression;

STEP 99: if on the last merge pass (i.e., when the number of strings to be merged is less than or equal to the number of input buffers), then compressing the data in the output buffer by any compression technique, without regard for whether nonessential information may be irretrievably lost;

STEP 100: when the output buffer is full of sorted and compressed data, writing the data in the output buffer to the storage system;

STEP 101: repeating STEPS 96 through 100 for all substrings of the strings until all of the data is merged, thereby generating one compressed, sorted string.

In one example of using the compression methods of the present invention, a file comprising 50 strings of data, each initially containing 4 substrings (for a total of 200 substrings) was pre-sorted. However, because of prefix compression on the substrings, only 198 substrings were written out after the pre-sort phase. Subsequently, during the merge phase, prefix compression and, in the last merge pass, suffix compression, was applied. The final sorted and compressed file comprised only 164 substrings. Thus, 36 substrings were eliminated during processing, with a consequent reduction in I/O operations. It should be remembered that the contents of the substrings are read and written numerous times during a pre-sort and merge sorting process, so that the elimination of even one sub-string's worth of space results in a savings of multiple read and write operations.

Figure 10:
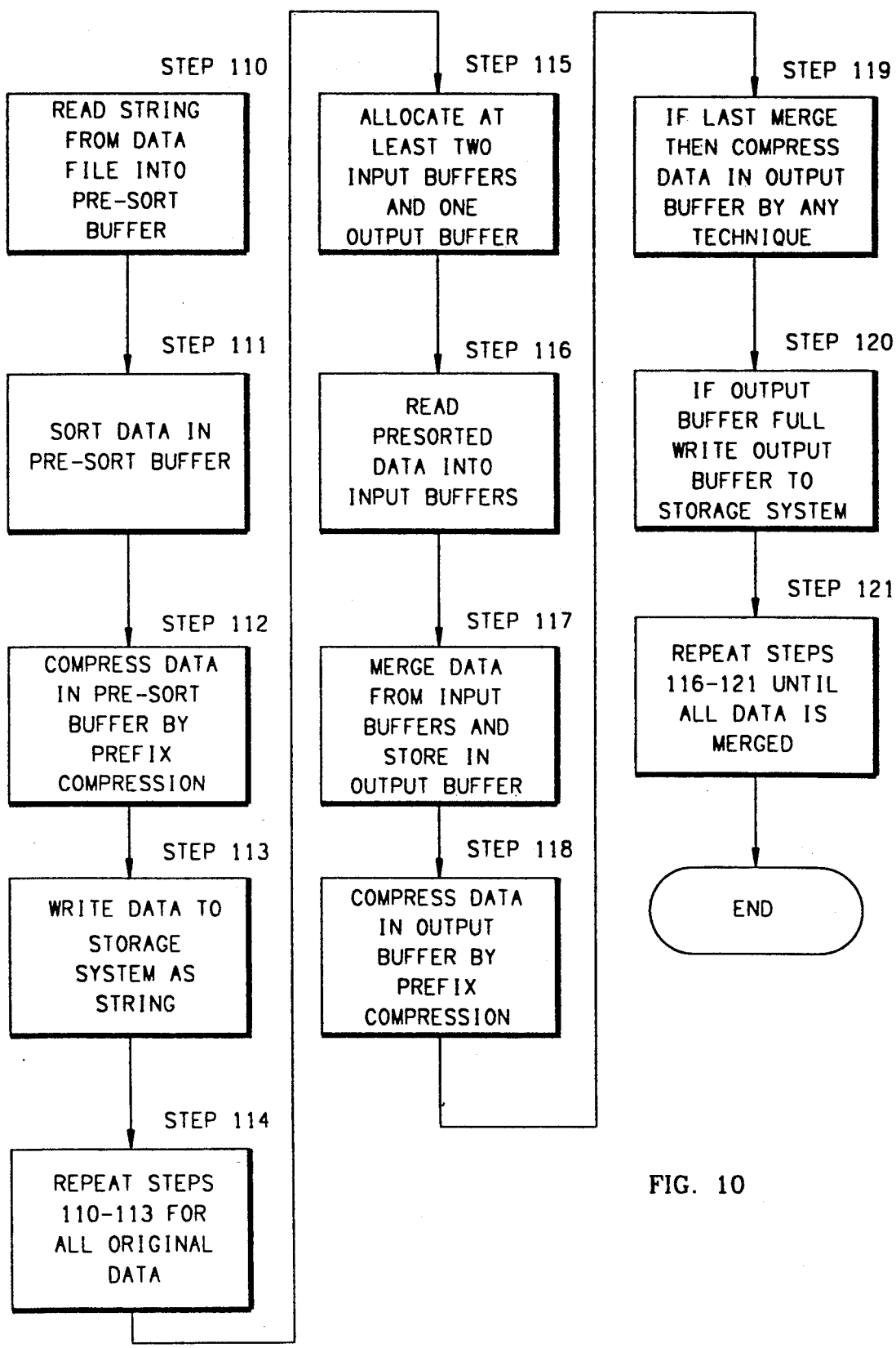
FIG. 10 is a high-level flow chart of the compression method of the present invention applied to a conventional sorting process.

In an alternative embodiment, the compression method described above can be used with a conventional pre-sort and merge sorting method, since the existence of substrings is not necessary to the practice of the compression method. That is, the inventive compression method can be beneficially applied during any sort process where the file to be sorted cannot be contained with the memory of a computer system all at one time. FIG. 10 is a high-level flow chart of the compression method of the present invention applied to a conventional sorting process. In STEPS 110-114, the original data file is presorted into a plurality of data strings. The individual steps include:

STEP 110: reading an input-buffer amount (a string) of data from the data file on the storage system into a pre-sort buffer;

STEP 111: sorting the data in the pre-sort buffer;

STEP 112: compressing the sorted data in the pre-sort buffer by any method which does not cause information to be irretrievably lost, such as by prefix compression;

STEP 113: writing the sorted data in the pre-sort buffer to the storage system as a string;

STEP 114: repeating STEPS 110 through 113 for all of the original data on the storage system, thereby generating a plurality of sorted and compressed strings stored on the storage system.

In STEPS 115-121, the pre-sorted strings are merged into a single sorted and compressed file. The individual steps include:

STEP 115: allocating in the computer memory at least two input buffers and one output buffer;

STEP 116: reading an input-buffer full of data from at least two sorted and compressed strings into a corresponding input buffer;

STEP 117: merging the data in the input buffers into sorted order and storing the merged data in the output buffer;

STEP 118: compressing the data in the output buffer by any method which does not cause information to be irretrievably lost, such as by prefix compression;

STEP 119: if on the last merge pass (i.e., when the number of strings to be merged is less than or equal to the number of input buffers), then compressing the data in the output buffer by any compression technique, without regard for whether nonessential information may be irretrievably lost;

STEP 120: when the output buffer is full of sorted and compressed data, writing the data in the output buffer to the storage system;

STEP 121: repeating STEPS 116 through 120 for all data in the strings until all of the data is merged, thereby generating one compressed, sorted string.

This aspect of the invention provides a method for significantly reducing the time required to create a search key tree structure by using compression techniques during the sort process to decrease the number of I/O operations needed to create a sorted and compressed search key file from a large, unsorted search key file. As an added advantage over the prior art, the speed of the tree building process is increased because the size of the search keys is reduced, and thus more search keys are read into memory in each tree-building read operation. The present invention contrasts with the prior art by moving the compression phase of processing to run concurrently with the sort process, rather than as a distinct phase occurring only after the search key file is sorted.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for sorting and compressing data on a storage system using a computer having (1) means for reading data from and writing data to the storage system, and (2) memory means for temporarily storing data in at least one buffer, including the steps of:

(a) pre-sorting the original data into a plurality of data strings, including the steps of:
(1) reading part of the data from the storage system into a pre-sort buffer;
(2) sorting the data in the pre-sort buffer;
(3) optionally compressing the sorted data in the pre-sort buffer by at least one method which does not cause information to be irretrievably lost;
(4) writing the sorted data in the pre-sort buffer to the storage system as a data string;
(5) repeating steps (a)(1) through (a)(4) for all of the original data on the storage system, thereby generating a plurality of sorted data strings stored on the storage system;
(b) merging the data into a sorted and compressed string, including the steps of:
(1) allocating in the memory means at least two input buffers and one output buffer;
(2) reading into each input buffer a portion of a corresponding sorted string;
(3) merging the data in the input buffers into sorted order and storing the sorted data in the output buffer;
(4) compressing data stored in the output buffer by at least one compression method which does not cause information to be irretrievably lost;
(5) optionally, when the number of strings have been merged into a number equal to, or less than the number of input buffers, compressing the data stored in the output buffer by at least one compression method without regard for whether information may be irretrievably lost;
(6) writing the sorted and compressed data in the output buffer to the storage system as needed;
(7) repeating steps (b)(2) through (b)(6) for all portions of the strings until all of the data therein is merged, thereby generating one compressed, sorted string.

2. The method of claim 1 for sorting and compressing data, wherein the compression method which does not cause information to be irretrievably lost is prefix compression.

3. The method of claim 1 for sorting and compressing data, wherein the compression method for compressing data without regard for whether information may be irretrevably lost is suffix compression.

4. The method of claim 1 for sorting and compressing data, wherein the compression method which does not cause information to be irretrievably lost is repeated trailing character deletion.

5. The method of claim 4, wherein the data in the pre-sort buffer is scanned for occurrences of repeated trailing characters, and repeated trailing character deletion is performed during merging of data in the input buffers only if the number of characters to be deleted exceeds the number of keys.

6. A method for logically sorting and compressing data on a storage system using a computer having (1) means for reading data from and writing data to the storage system, and (2) memory means for temporarily storing data in at least one buffer, including the steps of:
(a) pre-sorting the original data into a plurality of data strings each comprising a plurality of substrings, including the steps of:
(1) reading part of the data from the storage system into a pre-sort buffer;
(2) sorting the data in the pre-sort buffer;
(3) generating substring pointer fields for the sorted data in the pre-sort buffer at intervals corresponding to a determined substring length, with each substring pointer field being set to indicate the location in the storage system of the next logical substring;
(4) optionally compressing the sorted substrings in the pre-sort buffer by at least one method which does not cause information to be irretrievably lost;
(5) writing the sorted data in the pre-sort buffer to the storage system as a data string;
(6) repeating steps (a)(1) through (a)(5) for all of the original data on the storage system, thereby generating a plurality of sorted data strings, each comprising a plurality of substrings, stored on the storage system;
(b) merging the data in place on the storage system into a set of logically linked, sorted substrings, including the steps of:
(1) allocating in the memory means at least two input buffers and one output buffer each of a length sufficient to store a substring;
(2) establishing a substring storage area tracking means for indicating available storage areas on the storage system from which substrings have been previously read;
(3) reading the data from a substring from respective ones of the plurality of data strings into respective ones of the input buffers;
(4) merging the data of the substrings in the input buffers into sorted order and storing the sorted data in the output buffer;
(5) compressing data stored in the output buffer by at least one compression method which does not cause information to be irretrievably lost;
(6) optionally, when the number of strings have been merged into a number equal to, or less than the number of input buffers, compressing the data stored in the output buffer by at least one compression method without regard for whether information may be irretrievably lost;
(7) when the output buffer is essentially full or sorted and compressed data, writing the data in the output buffer as a new substring to the storage system in an available storage area, determined from the substring storage area tracking means, and changing the substring pointer field corresponding to the new substring to indicate the location of the next available storage area, determined from the substring storage area tracking means;
(8) repeating steps (b)(3) through (b)(7) for all substrings of the plurality of data strings and all new substrings until all of the data therein is merged, thereby generating a set of compressed substrings linked in sorted logical order by means of the substring pointer fields.

7. The method of claim 6 for sorting and compressing data, wherein the compression method which does not cause information to be irretrievably lost is prefix compression.

8. The method of claim 6 for sorting and compressing data, wherein the compression method for compressing data without regard for whether information may be irretrevably lost is suffix compression.

9. The method of claim 6 for sorting and compressing data, wherein the compression method which does not cause information to be irretrievably lost is repeated trailing character deletion.

10. The method of claim 9, wherein the data in the pre-sort buffer is scanned for occurrences of repeated trailing characters, and repeated trailing character deletion is performed during merging of data in the input buffers only if the number of characters to be deleted exceeds the number of keys.

11. The method of claim 6 for logically sorting and compressing data on a storage system, wherein the number of input buffers is N, where N is greater than or equal to 2, and the step of merging data uses N-way merging.

12. The method of claim 11 for logically sorting and compressing data on a storage system, wherein N is 3.

13. The method of claim 11 for logically sorting and compressing data on a storage system, wherein N is 4.

14. The method of claim 6 for logically sorting and compressing data on a storage system, wherein the optimum substring length is determined by dividing the amount of available working space in the memory means by the number of allocated input buffers plus one.

15. The method of claim 6 for logically sorting and compressing data on a storage system, wherein the substring pointer fields contain relative record numbers.

16. The method of claim 6 for logically sorting and compressing data on a storage system, wherein the generated substring pointer fields are written to the storage system with the corresponding data strings.

17. A method for generating a key index compressed multi-node tree structure for data on a storage system using a computer having (1) means for reading data from and writing data to the storage system, and (2) memory means for temporarily storing data in at least one buffer, including the steps of:
   (a) pre-sorting the original data into a plurality of data strings each comprising a plurality of substrings, including the steps of:
      (1) reading part of the data from the storage system into a pre-sort buffer;
      (2) sorting the data in the pre-sort buffer;
      (3) generating substring pointer fields for the sorted data in the pre-sort buffer at intervals corresponding to a determined substring length, with each substring pointer field being set to indicate the location in the storage system of the next logical substring;
      (4) optionally compressing the sorted substrings in the pre-sort buffer by at least one method which does not cause information to be irretrievably lost;
      (5) writing the sorted data in the pre-sort buffer to the storage system as a data string;
      (6) repeating steps (a)(1) through (a)(5) for all of the original data on the storage system, thereby generating a plurality of sorted data strings, each comprising a plurality of substrings, stored on the storage system;
   (b) merging the data in place on the storage system into a set of logically linked, sorted, compressed substrings, including the steps of:
      (1) allocating in the memory means at least two input buffers and one output buffer each of a length sufficient to store a substring;
      (2) establishing a substring storage area tracking means for indicating available storage areas on the storage system from which substrings have been previously read;
      (3) reading the data from a substring from respective ones of the plurality of data strings into respective ones of the input buffers;
      (4) merging the data of the substrings in the input buffers into sorted order and storing the sorted data in the output buffer;
      (5) compressing data stored in the output buffer by at least one compression method which does not cause information to be irretrievably lost;
      (6) optionally, when the number of strings have been merged into a number equal to, or less than the number of input buffers, compressing the data stored in the output buffer by at least one compression method without regard for whether information may be irretrievably lost;
      (7) when the output buffer is essentially full of sorted and compressed data, writing the data in the output buffer as a new substring to the storage system in an available storage area, determined from the substring storage area tracking means, and changing the substring pointer field corresponding to the new substring to indicate the location of the next available storage area, determined from the substring storage area tracking means;
      (8) repeating steps (b)(3) through (b)(7) for all substrings of the plurality of data strings and all new substrings until all of the data therein is merged, thereby generating a set of compressed substrings linked in sorted logical order by means of the substring pointer fields;
   (c) generating a key index compressed multi-node tree structure for the data in the sorted set of substrings stored on the storage system, including the steps of:
      (1) establishing at least a first level branch node table for temporarily storing location reference information indicative of the location of selected data in the storage system;
      (2) reading into a tree index buffer the data from at least one node of data in the storage system, a node initially comprising at least one compressed substring of the set of linked compressed substrings;
      (3) generating a location reference for a selected portion of the data in the tree index buffer and storing the location reference in the first level of the branch node table;
      (4) when the first level branch node table is full, writing the contents of the branch node table to the storage system as a generated node of the tree structure;
      (5) repeating steps (c)(2) through (c)(4) for all nodes in the storage system containing linked compressed substrings, wherein the nodes are read in sorted order;
      (6) repeating steps (c)(2) through (c)(4) for all generated nodes of the tree structure until a single root node for the tree structure is written to the storage system.

18. The method of claim 17 for sorting and compressing data, wherein the compression method which does not cause information to be irretrievably lost is prefix compression.

19. The method of claim 17 for sorting and compressing data, wherein the compression method for compressing data without regard for whether information may be irretrievably lost is suffix compression.

20. The method of claim 17 for sorting and compressing data, wherein the compression method which does not cause information to be irretrievably lost is repeated trailing character deletion.

21. The method of claim 20, wherein the data in the pre-sort buffer is scanned for occurrences of repeated trailing characters, and repeated trailing character deletion is performed during merging of data in the input buffers only if the number of characters to be deleted exceeds the number of keys.

22. The method of claim 17 for generating a key index compressed multi-node tree structure for data, further including the steps of:
(a) generating a location reference for a selected portion of the data in a previous level branch node table and storing the location reference in a next level branch node table;
(b) when the next level branch node table is full, writing the contents of the next level branch node table to the storage system as a generated node of the tree structure.

23. The method of claim 17 for generating a key index compressed multi-node tree structure for data, wherein the number of input buffers is N, where N is greater than or equal to 2, and the step of merging data uses N-way merging.

24. The method of claim 23 for generating a key index compressed multi-node tree structure for data, wherein N is 3.

25. The method of claim 23 for generating a key index compressed multi-node tree structure for data, wherein N is 4.

26. The method of claim 17 for generating a key index compressed multi-node tree structure for data, wherein the optimum substring length is determined by dividing the amount of available working space in the memory means by the number of allocated input buffers plus one.

27. The method of claim 17 for generating a key index compressed multi-node tree structure for data, wherein the substring pointer fields contain relative record numbers.

28. The method of claim 17 for generating a key index compressed multi-node tree structure for data, wherein the generated substring pointer fields are written to the storage system with the corresponding data strings.

29. A method for physically sorting and compressing data on a storage system using a computer having (1) means for reading data from and writing data to the storage system, and (2) memory means for temporarily storing data in at least one buffer, including the steps of:
(a) pre-sorting the original data into a plurality of data strings each comprising a plurality of compressed substrings, including the steps of:
(1) reading part of the data from the storage system into a pre-sort buffer;
(2) sorting the data in the pre-sort buffer;
(3) generating substring pointer fields for the sorted data in the pre-sort buffer at intervals corresponding to a determined substring length, with each substring pointer field being set to indicate the location in the storage system of the next logical substring;
(4) optionally compressing the sorted substrings in the pre-sort buffer by at least one method which does not cause information to be irretrievably lost;
(5) writing the sorted data in the pre-sort buffer to the storage system as a data string;
(6) repeating steps (a)(1) through (a)(5) for all of the original data on the storage system, thereby generating a plurality of sorted data strings, each comprising a plurality of substrings, stored on the storage system;
(b) merging the data in place on the storage system into a set of logically linked, sorted, compressed substrings, including the steps of:
(1) allocating in the memory means at least two input buffers and one output buffer each of a length sufficient to store a substring;
(2) establishing a substring storage area tracking means for indicating available storage areas on the storage system from which substrings have been previously read;
(3) reading the data from a substring from respective ones of the plurality of data strings into respective ones of the input buffers;
(4) merging the data of the substrings in the input buffers into sorted order and storing the sorted data in the output buffer;
(5) compressing data stored in the output buffer by at least one compression method which does not cause information to be irretrievably lost;
(6) optionally, when the number of strings have been merged into a number equal to, or less than the number of input buffers, compressing the data stored in the output buffer by at least one compression method without regard for whether information may be irretrievably lost;
(7) when the output buffer is essentially full of sorted and compressed data, writing the data in the output buffer as a new substring to the storage system in an available storage area, determined from the substring storage area tracking means, and changing the substring pointer field corresponding to the new substring to indicate the location of the next available storage area, determined from the substring storage area tracking means;
(8) repeating steps (b)(3) through (b)(7) for all substrings of the plurality of data strings and all new substrings until all of the data therein is merged, thereby generating a set of compressed substrings linked in sorted logical order by means of the substring pointer fields;
(c) physically sorting the set of linked, compressed substrings, including the steps of:
(1) reading into the memory means a compressed substring of the set of linked, compressed substrings;
(2) reading into the memory means a next compressed substring in the location indicated by the value of the substring pointer field of the previous compressed substring;
(3) writing the previous compressed substring in the location indicated by the value of the substring pointer field of such substring;
(4) repeating steps (c)(2) and (c)(3) for such next compressed substring, and for each subsequent compressed substring of the set of linked compressed substrings, thereby generating a set of compressed substrings in physically sorted order.

30. The method of claim 29 for sorting and compressing data, wherein the compression method which does not cause information to be irretrievably lost is prefix compression.

31. The method of claim 29 for sorting and compressing data, wherein the compression method for compressing data without regard for whether information may be irretrievably lost is suffix compression.

32. The method of claim 29 for sorting and compressing data, wherein the compression method which does not cause information to be irretrievably lost is repeated trailing character deletion.

33. The method of claim 32, wherein the data in the pre-sort buffer is scanned for occurrences of repeated trailing characters, and repeated trailing character deletion is performed during merging of data in the input buffers only if the number of characters to be deleted exceeds the number of keys.

34. The method of claim 29 for physically sorting and compressing data on a storage system, wherein the number of input buffers is N, where N is greater than or equal to 2, and the step of merging data uses N-way merging.

35. The method of claim 34 for physically sorting and compressing data on a storage system, wherein N is 3.

36. The method of claim 34 for physically sorting and compressing data on a storage system, wherein N is 4.

37. The method of claim 29 for physically sorting and compressing data on a storage system, wherein the optimum substring length is determined by dividing the amount of available working space in the memory means by the number of allocated input buffers plus one.

38. The method of claim 29 for physically sorting and compressing data on a storage system, wherein the generated substring pointer fields are written to the storage system with the corresponding data strings.

* * * * *